US007068346B2

(12) United States Patent
Lee et al.

(10) Patent No.: US 7,068,346 B2
(45) Date of Patent: Jun. 27, 2006

(54) SEAL PATTERN FOR ULTRA-THIN LIQUID CRYSTAL DISPLAY DEVICE

(75) Inventors: Jong-Chil Lee, Gumi-si (KR); Dong-Ki Baek, Daegu-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/004,062

(22) Filed: Dec. 6, 2004

(65) Prior Publication Data
US 2005/0094086 A1     May 5, 2005

Related U.S. Application Data

(62) Division of application No. 10/279,116, filed on Oct. 24, 2002.

(30) Foreign Application Priority Data
Nov. 7, 2001    (KR) ............................... 2001-69110

(51) Int. Cl.
*G02F 1/1339*     (2006.01)
(52) U.S. Cl. ...................... 349/189; 349/153; 349/154; 349/190
(58) Field of Classification Search .............. 349/154, 349/189, 190
See application file for complete search history.

(56) References Cited

U.S. PATENT DOCUMENTS 6,310,678 B1   10/2001   Shimotoyodome
6,678,029 B1 * 1/2004   Suzuki ....................... 349/154
2001/0015786 A1* 8/2001   Katsura ..................... 349/153
2002/0033926 A1* 3/2002   Nakahara et al. ........... 349/154

FOREIGN PATENT DOCUMENTS

| JP | 2-138459 | 5/1990 |
| JP | 3-22390 | 1/1991 |
| JP | 4-116619 | 4/1992 |
| JP | 4-265942 | 9/1992 |
| JP | 5-188386 | 7/1993 |
| JP | 05188386 A * | 7/1993 |
| JP | 5-249422 | 9/1993 |
| JP | 5-249423 | 9/1993 |
| JP | 7-168172 | 7/1995 |

* cited by examiner

*Primary Examiner*—Andrew Schechter
*Assistant Examiner*—Michael H. Caley
(74) *Attorney, Agent, or Firm*—McKenna Long & Aldridge LLP

(57) ABSTRACT

A seal pattern for a liquid crystal display device includes a substrate having an active area and a non-active area, a main seal pattern arranged in a boundary between the active area and the non-active area and having an injection hole, a V-shaped seal pattern arranged in the non-active area and spaced apart from the injection hole, wherein an open portion of the V-shape faces in a direction opposite the injection hole, and a sub-seal pattern arranged in the non-active area, having a same width as that of the main seal pattern, and having a plurality of exhaust holes arranged in positions corresponding to the V-shaped seal pattern and the injection hole.

8 Claims, 7 Drawing Sheets

US 7,068,346 B2

SEAL PATTERN FOR ULTRA-THIN LIQUID CRYSTAL DISPLAY DEVICE

This application is a divisional of prior application Ser. No. 10/279,116, filed Oct. 24, 2002.

This application claims the benefit of Korean Patent Application No. 2001-69110, filed on Nov. 7, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a seal pattern for ultra-thin liquid crystal display devices.

2. Discussion of the Related Art

Liquid crystal display (LCD) devices such as active matrix LCDs (AM LCDs) are widely used in devices such as notebook computers, desktop monitors, etc., due in part to their high resolution and their ability to display color and moving images. LCD devices generally include an upper substrate (i.e., an array substrate) coupled to, and spaced apart from, a lower substrate (i.e., a color filter substrate). A layer of liquid crystal material is typically disposed between the array and color filter substrates. Electrodes are provided on each of the upper and lower substrates such that electrodes of opposing substrates face each other. Anisotropic optical properties of the liquid crystal materials may be exploited by liquid crystal display devices to produce images. By varying the orientation of liquid crystal molecules in an electric field, the transmissivity of light within the layer of liquid crystal material may be selectively controlled. Liquid crystal display devices also include thin film transistors and pixel electrodes arranged in a matrix pattern.

Fabrication of LCD devices typically involves many processes including the formation of an array substrate, formation of a color filter substrate, and injection of liquid crystal material between the array and color filter substrates. Formation of array substrates includes forming switching elements and pixel electrodes. Formation of color filter substrates includes forming color filters and common electrodes.

FIG. 1 illustrates a cross-sectional view of a liquid crystal display panel used in a typical LCD device.

Referring to FIG. 1, an upper substrate 10 and a lower substrate 30 are coupled to, and spaced apart from each other. A layer of liquid crystal material 50 is interposed between the upper and lower substrates 10 and 30, respectively. A gate electrode 32 is formed on a transparent substrate 1 included within the lower substrate 30 and a gate insulator 34 is formed on the gate electrode 32. A semiconductor layer 36, including an active layer 36a and an ohmic contact layer 36b, is formed on the gate insulator 34. A source electrode 38 and a drain electrode 40 are formed on the semiconductor layer 36. A channel region "ch", including an exposed portion of the active layer 36a, is formed between the source electrode 38 and the drain electrode 40. The gate electrode 32, the semiconductor layer 36, the source electrode 38, the drain electrode 40, and the channel "ch" constitute a thin film transistor "T". Though not shown in FIG. 1, a plurality of gate lines are connected to the gate electrode 32 and extend along a first direction. Further, a plurality of data lines are connected to the source electrode 38 and extend along a second direction, perpendicular to the first direction. Crossings of the gate and data lines defines pixel regions "P". A passivation layer 42, including a drain contact hole 44 formed therein, is formed on the thin film transistor "T". A pixel electrode 48 is formed in the pixel region "P" and is connected to the drain electrode 40 via the drain contact hole 44. A cell area of the array substrate includes a connection portion for connecting to an external driving circuit. Accordingly, the cell area of the array substrate is wider than a corresponding cell area of the color filter substrate. A lower alignment layer 46 is formed on both the passivation layer 42 and the pixel electrode 48 in order to induce an alignment of the liquid crystal material 50. A color filter 14, for filtering light within a specific wavelength range, is formed beneath a transparent substrate 1 included within an upper substrate 30 at a position corresponding to the pixel electrode 48. A black matrix 12, for protecting light leakage and for preventing light from contacting the thin film transistor "T", is formed in boundary areas between each color portion of the color filter 14. A common electrode 16, serving as an electrode with which to apply voltage to the layer of liquid crystal material 50, is formed beneath the color filter 14 and the black matrix 12. An upper alignment layer 18, similar to the lower alignment layer 46, is formed beneath the common electrode 16. A cell gap between the upper and lower substrates 10 and 30, respectively, is sealed using a seal pattern 52. The seal pattern 52 is provided along the edges of the substrates to prevent leakage of liquid crystal material 50. Additionally, the seal pattern 52 maintains the upper and lower substrates 10 and 30 a predetermined distance from one another (e.g., maintains the cell gap between the upper and lower substrates 10 and 30, respectively) and enables liquid crystal material to be injected.

As LCD manufacturing technologies progress, LCDs are finding new applications in lap-top computers, video cameras, aviation instrument panels, other electronic devices, etc., the manufacturable size of substrates in LCDs increase, and ways of fabricating LCDs to be thinner and lighter continue to be evaluated.

Typical glass substrates used in LCDs are about 0.7 mm thick. As the size of the substrate increases, however, the weight and thickness of the substrates must be reduced through chemical (e.g., with the use of etchants such as hydrofluoric acid) or physical (e.g., grinding, polishing, etc.) material removal processes. Through these material removal processes, minimum substrate thicknesses of about 0.5 mm to 0.6 mm are attainable upon consideration of factors such as substrate bending and external impacts encountered during a high speed revolution spin coating processes. Physical material removal processes are often ineffective in maintaining optimal surface roughness and substrate thickness. Accordingly, chemical material removal processes may be employed by dipping LCD substrates in, for example, a hydrofluoric acid solution.

The fabrication of liquid crystal cells typically includes steps of forming an alignment layer to align liquid crystal molecules, forming a cell gap, cutting cells, injecting liquid crystal material, and sealing an injection hole arranged between the substrates.

FIG. 2 illustrates a flow chart of a process used fabricating liquid crystal cells of ultra-thin liquid crystal display devices. A first process step (ST1) includes cleaning the array and color filter substrates by removing particles on the substrate prior to formation of the alignment layer on the substrate. A second process step (ST2) includes forming the alignment layer by forming thin polymer film on the substrate, hardening, and rubbing the thin polymer film. A third process step (ST3) includes forming a seal pattern and a spacer. The seal pattern forms a cell gap allowing the injection of liquid crystal material between the substrates and preventing the injected liquid crystal material from leaking. In ultra-thin liquid crystal display devices, the seal pattern also includes a sub-seal pattern for preventing etchants from infiltrating into the cell gap during any of the aforementioned material removal processes. The seal pattern is fabricated using screen-printing technology, thermosetting resin, and glass fiber. The spacer is usually formed on the array substrate and uniformly maintains the gap between the two substrates. The seal pattern is typically formed on the color filter substrate to minimize error in attaching the upper and lower substrates. A fourth process step (ST4) includes aligning and attaching the upper and lower substrates to each other. The degree to which the upper and lower substrates may be aligned is determined by a measuring an alignment margin, usually less than a few microns, provided when the substrates are initially designed. If the upper and lower substrates are aligned and attached with an alignment margin larger than a predetermined error margin, the display quality of the liquid crystal display device may be deteriorated due to light leakage during operation of the liquid crystal cell. After the seal pattern is formed on one of the upper or lower substrates, the substrates undergo a pre-heating process and are attached together in a temporary fixing process. Subsequently, the substrates are permanently attached together using a hardening process (e.g., a thermo-compression bonding process). A fifth processing step (ST5) includes cutting the attached substrates into a cell unit. A single glass substrate typically includes a plurality of smaller array or color filter substrates in cell areas that need to be separated. A sixth process step (ST6) includes injecting liquid crystal material into the separated cells. Since each cell has a cell gap of only a few micrometers per hundreds of square centimeters in substrate area, a vacuum injection method, inducing a capillary phenomenon within the cell gap, is typically used in injecting liquid crystal material into the cell. After the liquid crystal material is injected to the cell, an injection hole through which the liquid crystal material was injected, is sealed. A seventh processing step (ST7) includes forming an ultra-thin substrate by etching the exterior surfaces of the attached substrates. As will be described in greater detail below, this etching process includes a cleaning step, an etching step, and a drying step. Upon completion of the aforementioned processing steps, the liquid crystal display panels are inspected. Subsequently, a polarization film is formed on an outer surface of each of the substrates and a driving circuit is connected to the substrates.

FIG. 3 illustrates a flow chart of a etching process for forming ultra-thin substrates described in step ST7 of FIG. 2.

Referring to FIG. 3, a first processing step (STI) includes removing contaminations from the exterior surfaces of the attached substrates is performed before they are etched within an etching apparatus. Contaminations found on the outer surfaces of the attached substrates can cause etching errors and prevent uniform etching of the substrates. Etching errors and non-uniform etching result in a degradation in the quality of images displayable by the liquid crystal display device by diffusing reflections and refractions at the surface of the attached substrates. Contaminations include organic films or minute particles and may be removed using cleaning solutions such as IPA (isopropyl alcohol) or DI water (deionized water). After contaminations are removed, the cleaned substrates are arranged within an etching apparatus containing an etchant such as a hydrofluoric acid (HF) solution and are etched for a predetermined amount of time in a second processing step (STII). Subsequently, in third processing step (STIII), any etchant remaining on the substrates is removed. Finally, in fourth processing step (STIV), the cleaned substrates are dried.

FIG. 4 illustrates a plan view of a seal pattern used in typical ultra-thin liquid crystal display devices.

Referring to FIG. 4, a glass substrate may, for example, include two liquid crystal cells. The seal pattern of the ultra-thin type liquid crystal display device includes a main seal pattern 60a, in which the injection hole 61 is provided, and a sub-seal pattern 60b surrounding the main seal pattern 60a. The sub-seal pattern 60b does not contain any openings and thereby prevents etchant or cleaning solution from penetrating into the main seal pattern 60a.

FIG. 5 illustrates a cross-sectional view along a line V-V shown in FIG. 4.

Referring to FIG. 5, air between the main seal pattern 60a and the sub-seal pattern 60b is introduced when a substrate 68 is attached. Because the sub-seal pattern 60b does not include an opening, air becomes trapped between the substrates and the seal patterns and may cause serious problems. The air trapped between the main seal pattern 60a and the sub-seal pattern 60b may induce a rupture 64 in the main seal pattern 60a and produce air bubbles 66 in the sub-seal pattern 60b.

In order to solve the foregoing problems, Applicants of the present invention have disclosed in U.S. patent application Ser. No. 09/737,766, filed Aug. 9, 2001, a seal pattern structure for the ultra-thin liquid crystal display devices. FIG. 6A illustrates a plan view of the seal pattern structure of the ultra-thin liquid crystal display device disclosed in the aforementioned application. A plurality of seal patterns 82 are formed on the substrate 70 of the liquid crystal cell 72.

Referring to FIG. 6A, the seal pattern 82 includes a main seal pattern 74 having an injection hole 73, a first sub-seal pattern 76 surrounding the main seal pattern 74 and a second sub-seal pattern 78 surrounding the first sub-seal pattern 76 and maintained a predetermined distance from an edge of the substrate 70. The first and second sub-seal patterns 76 and 78, respectively, include at least one opening, VIa. A third sub-seal pattern 80 is formed between the first and second sub-seal patterns 76 and 78, respectively, adjacent the at least one opening VIa of the second sub-seal pattern 78.

FIG. 6B illustrates a magnified view of area "VIb" shown in FIG. 6A including an exhaust path taken by air during the thermo compression bonding process.

Referring to FIG. 6B, when the air is exhausted from the liquid crystal cell 72 during the thermo compression bonding process, a bottleneck phenomenon occurs and a high air pressure is concentrated at the injection hole 73. However, the exhaust path defined by the seal pattern shown in FIG. 6B is also long and tortuous. Accordingly, the exhaust path shown in FIG. 6B is inefficient in facilitating the transport of air and contributes to the generation of highly pressurized air at injection hole 73. The high air pressure weakens the adhesive strength of the sealant at the injection hole 73 and increases the likelihood of cell gap errors. Furthermore, alignment spots, capable of preventing certain pre-tilt angles from being imparted to the liquid crystal material, may be generated in a portion of the alignment layers located near the injection hole 73 as a result of the high air pressure.

SUMMARY OF THE INVENTION

Accordingly, the present invention is directed to a seal pattern structure of an ultra-thin liquid crystal display device that substantially obviates one or more of problems due to limitations and disadvantages of the related art.

An advantage of the present invention provides a seal pattern structure for a liquid crystal display device (e.g., an ultra-thin LCD device) allowing air introduced during an attaching process to be efficiently exhausted from a liquid crystal cell while preventing etchant from penetrating into the liquid crystal cell.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a seal pattern for a liquid crystal display device including a substrate with an active area and a non-active area includes a main seal pattern arranged in a boundary between the active and non-active areas and having an injection hole, a V-shaped seal pattern arranged in the non-active area, spaced apart from the injection hole, wherein an open portion of the V-shape faces in a direction opposite the injection hole, and a sub-seal pattern arranged in the non-active area, having a same width as that of the main seal pattern, and having a plurality of exhaust holes arranged in positions corresponding to the V-shaped seal pattern and the injection hole.

In one aspect of the present invention, the injection hole of the main seal pattern may include a plurality of injection hole dams that are spaced apart from each other.

In another aspect of the present invention, a thickness of the substrate may be between about 0.3 mm and about 0.6 mm.

In yet another aspect of the present invention, the sub-seal pattern may further include an oblique seal pattern arranged at sides of the V-shaped seal pattern wherein a distance between lower ends of the oblique seal pattern corresponds to a width of the injection hole. In one aspect of the present invention, the oblique seal pattern may include at least two members obliquely oriented towards each other.

In still another aspect of the present invention, the sub-seal pattern may further include a cell-support sub-seal pattern formed parallel to an upper portion of the main seal pattern. The cell-support sub-seal pattern may include side portions arranged to correspond with diagonal paths formed between the injection hole and the exhaust holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 7:
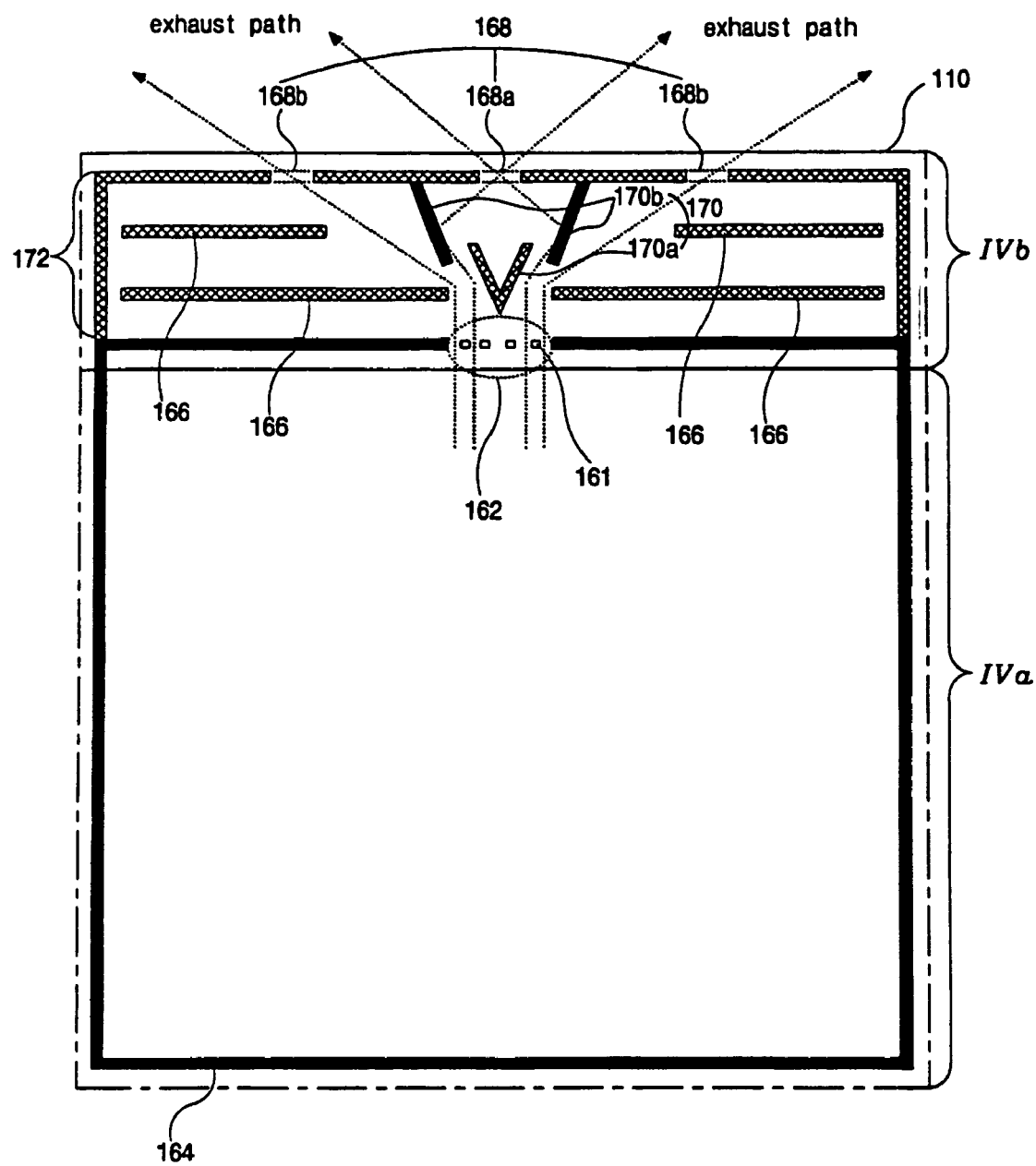
FIG. 7 illustrates a plan view of a seal pattern for a liquid crystal cell according to one aspect of the present invention.

FIG. 7 illustrates a plan view of a seal pattern structure for a liquid crystal cell (e.g., an ultra-thin liquid crystal cell) according to one aspect of the present invention.

Figure 1:
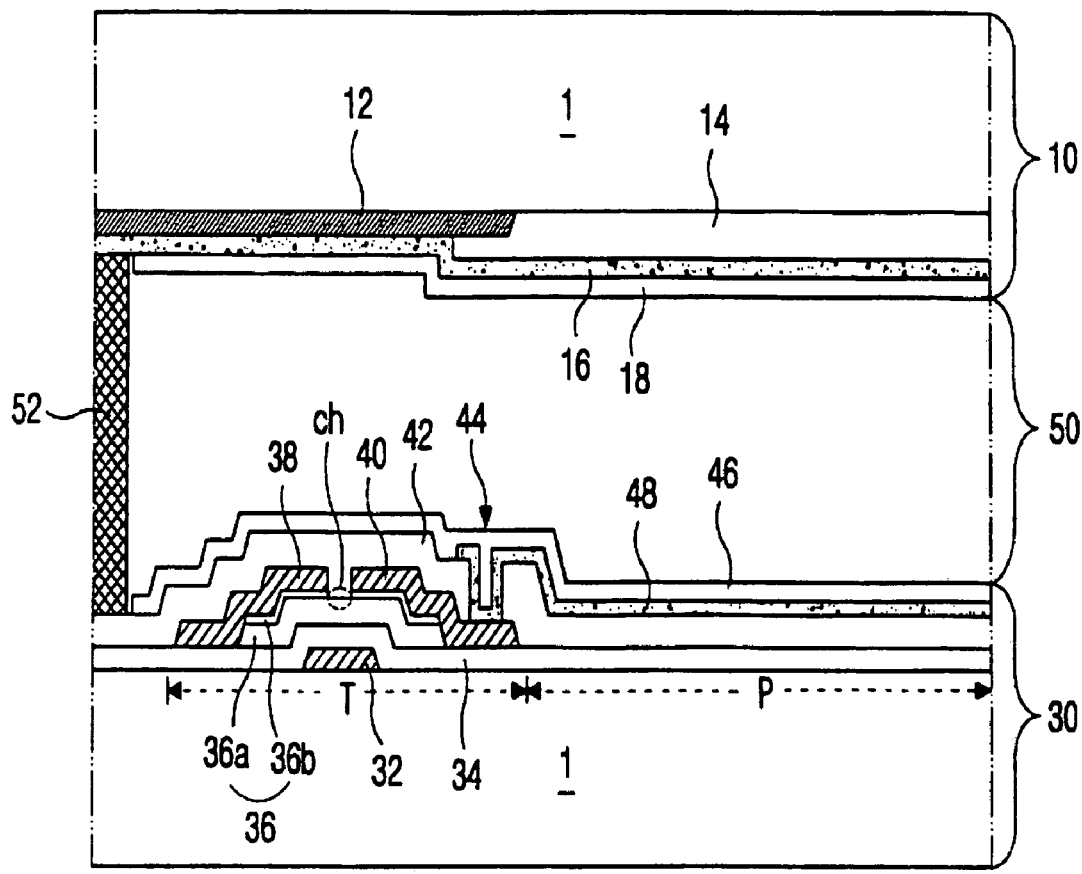
FIG. 1 illustrates a schematic cross-sectional view of a liquid crystal display panel used in a liquid crystal display device.
Figure 2:
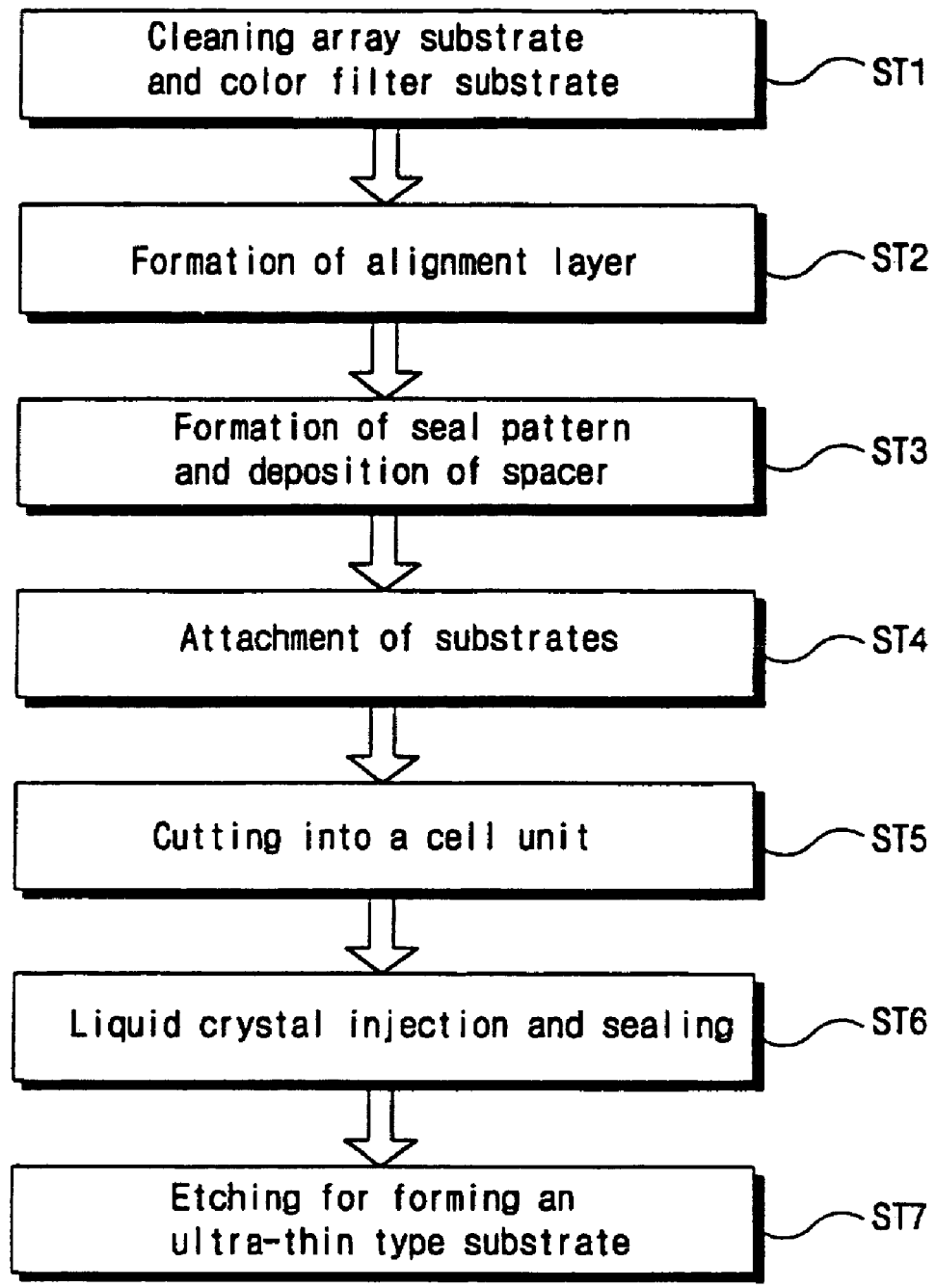
FIG. 2 illustrates a flow chart of a process used in fabricating an ultra-thin liquid crystal display device.
Figure 3:
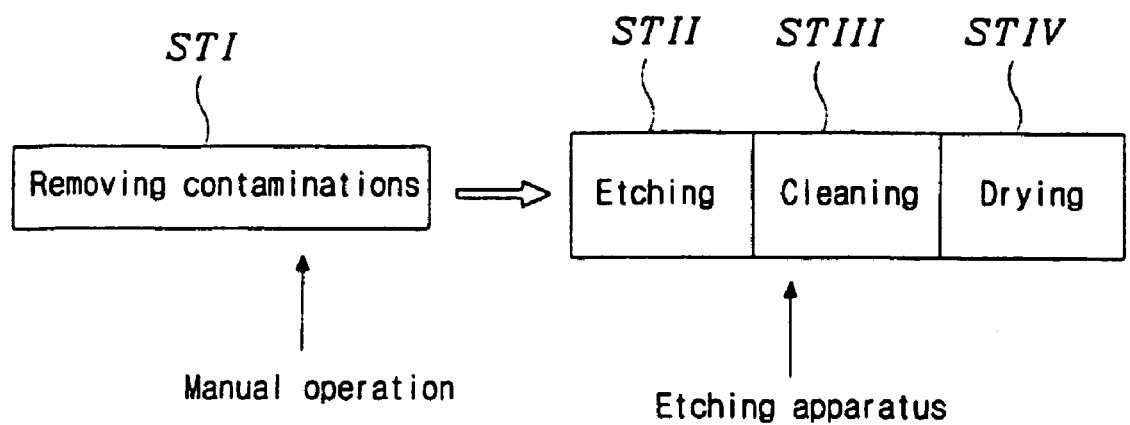
FIG. 3 illustrates a flow chart of a process corresponding to step ST7 as shown in FIG. 2.
Figure 4:
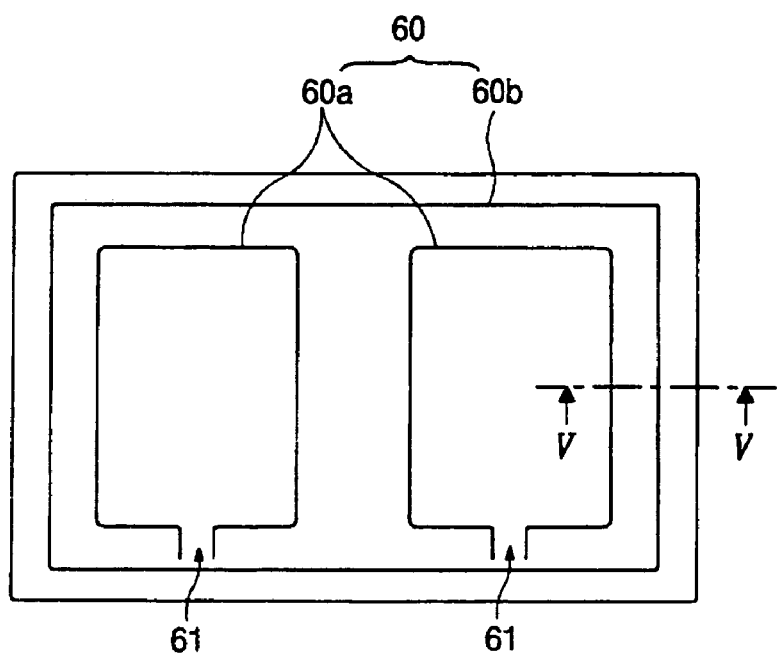
FIG. 4 illustrates a plan view of a seal pattern for use in ultra-thin liquid crystal display devices.
Figure 5:
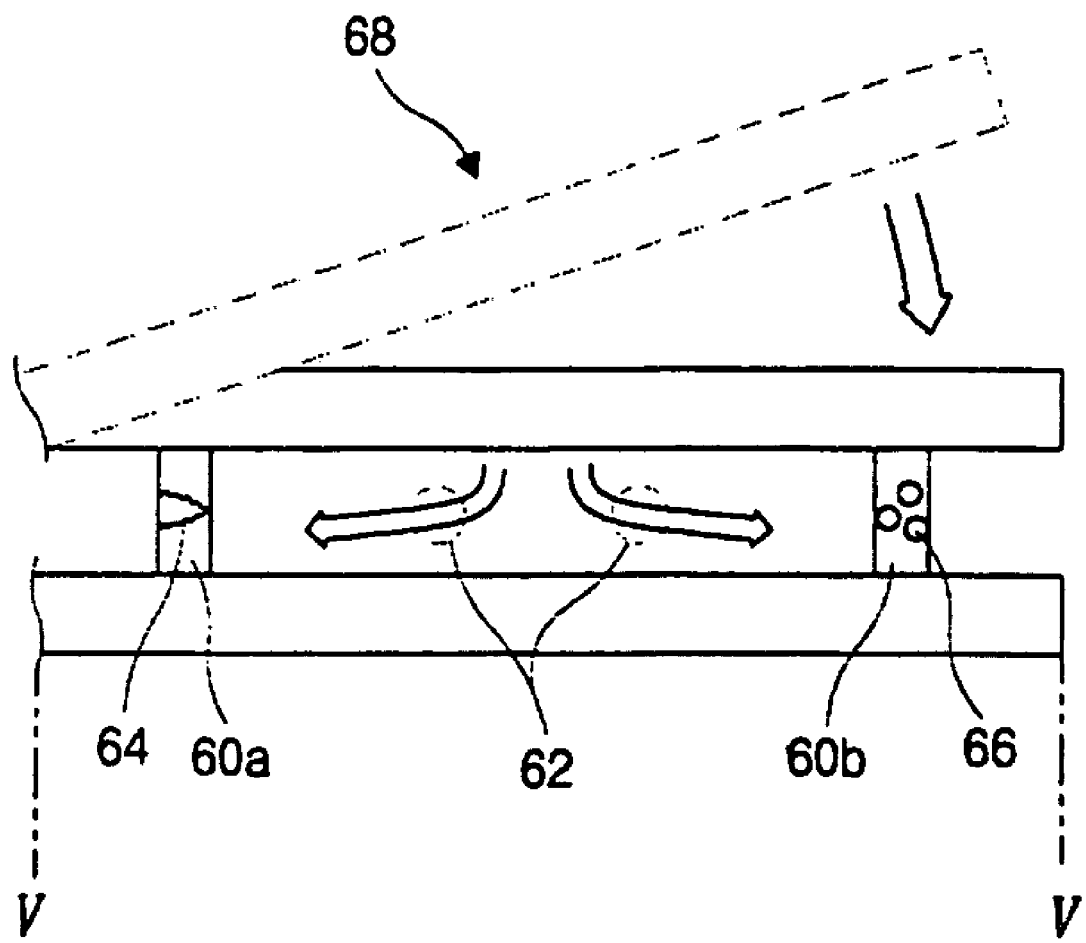
FIG. 5 illustrates a cross-sectional view taken along a line V—V as shown in FIG. 4.
Figure 6A:
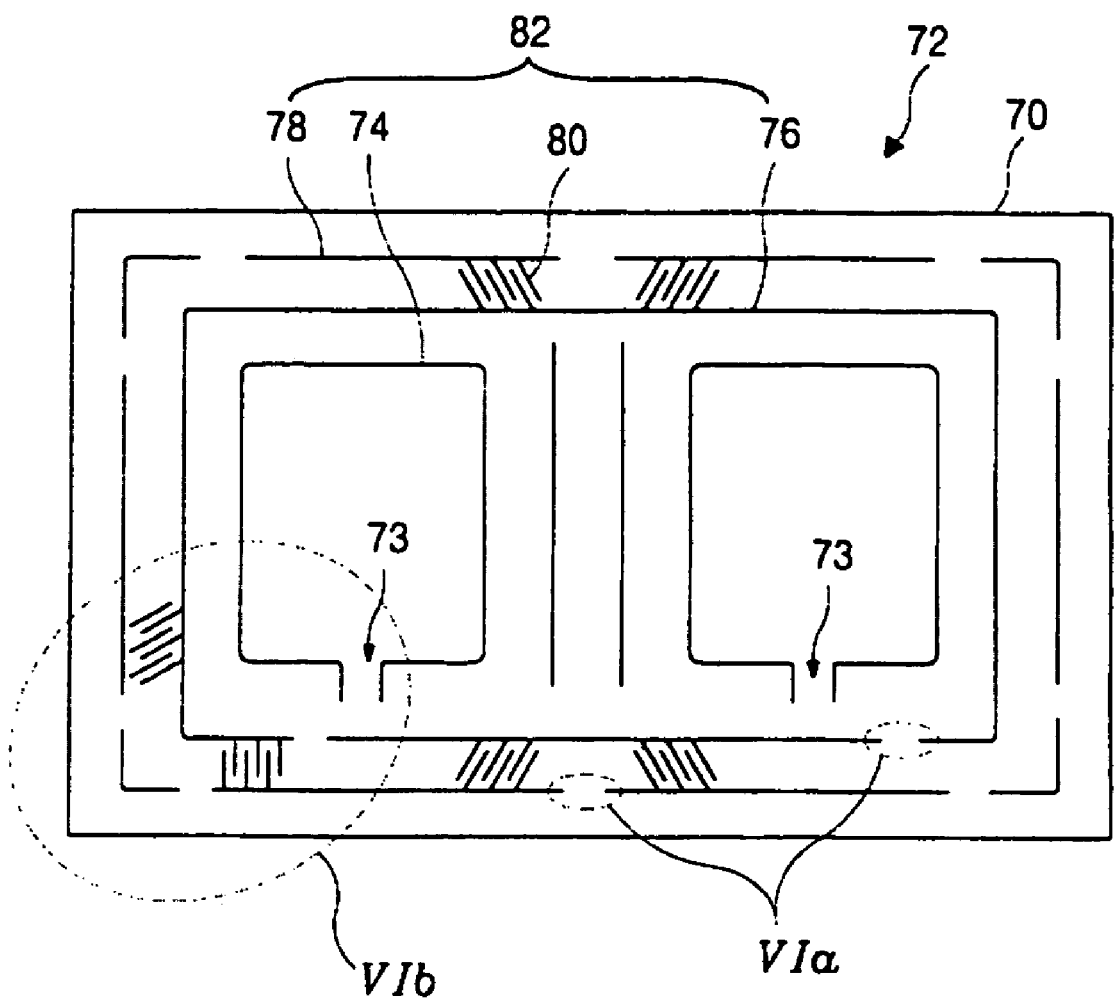
FIG. 6A illustrates a plan view of a seal pattern structure of an ultra-thin liquid crystal display device.
Figure 6B:
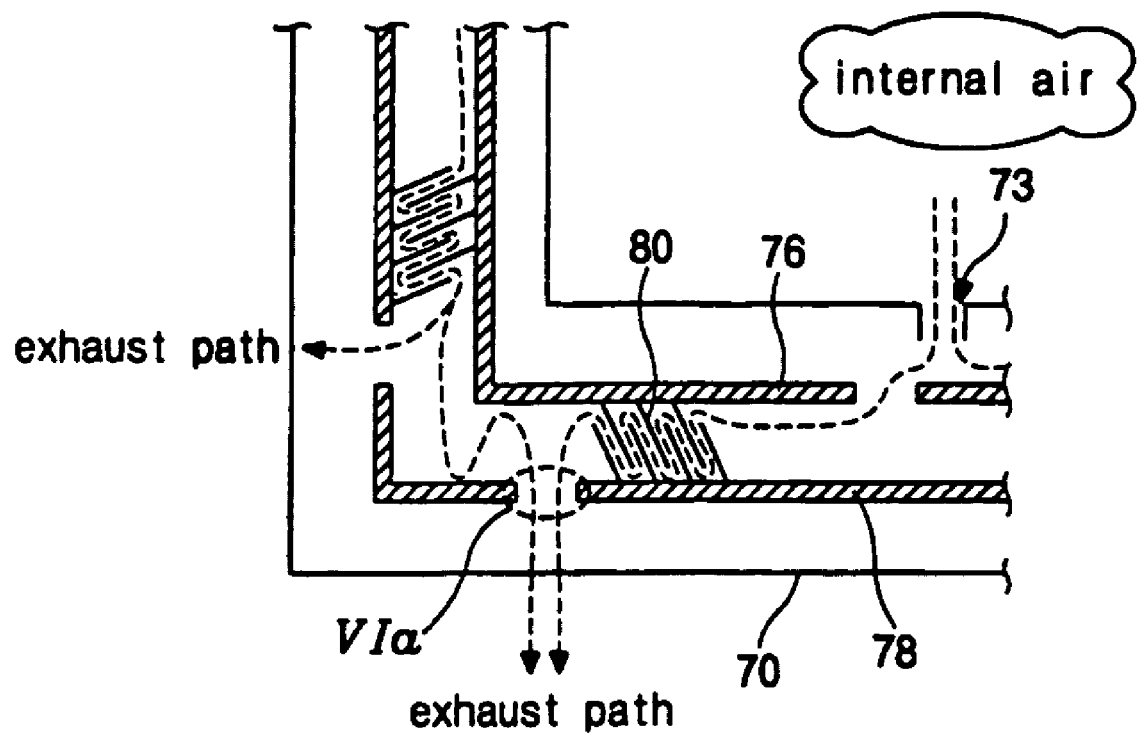
FIG. 6B illustrates an expanded view of area "VIb" as shown in FIG. 6A.

Referring to FIG. 7, the seal pattern according to the principles of the present invention may generally be formed on an attached substrate fabricated, for example, according to the processes outlined in FIG. 2. The attached substrate 110 may, for example, include an active area IVa and a non-active area IVb. In one aspect of the present invention, a main seal pattern 164 may be arranged in a boundary between the active area IVa and non-active area IVb. The main seal pattern 164 may, for example, include an injection hole 162. A plurality of injection hole dams 161 may be formed proximate the injection hole 162 (e.g., within the injection hole 162). In one aspect of the present invention the injection hole dams 161 may be arranged so as to be substantially symmetric about the center line of the injection hole 162. The injection hole dams 161 may serve to maintain uniformity of a cell gap at portions of a liquid crystal display panel where the main seal pattern 164 is not formed. The injection hole dams 161 may further prevent injected liquid crystal material from being exposed by the atmosphere. In one aspect of the present invention, the plurality of injection hole dams 161 may be formed such that they are spaced apart from each other.

In one aspect of the present invention, a sub-seal pattern 172 may be formed in the non-active area IVb, opposite the injection hole 162. The sub-seal pattern 172 may have substantially the same width as the main seal pattern 164 and also be formed to enclose the non-active area IVb. A plurality of exhaust holes 168 may be formed in an outer portion of the sub-seal pattern 172.

A first sub-seal pattern 170 may, for example, be formed within the sub-seal pattern 172 and opposite the injection hole 162. A second sub-seal pattern 166 may, for example, be formed within the sub-seal pattern 172 and at opposite sides of the first sub-seal pattern 170. In one aspect of the present invention, the first and second sub-seal patterns, 170 and 166, respectively, may support the substrates of the liquid crystal cell.

Referring still to FIG. 7, the sub-seal pattern 172 may include a first exhaust hole 168*a*, arranged in a position corresponding to the injection hole 162, and at least two second exhaust hole 168*b* spaced apart from the first exhaust hole 168*a* by a predetermined distance. The first sub-seal pattern 170 may include a first pattern 170*a*, which is substantially V-shaped. In one aspect of the present invention, the first pattern 170*a* may be substantially symmetric with respect to the center line of the injection hole 162. The first sub-seal pattern 170 may further include a second pattern 170b that may also be substantially symmetric with respect to the center line of the injection hole 162. In one aspect of the present invention, the first sub-seal pattern 170 may be substantially symmetric about the center line of the first exhaust hole 168a.

Dotted arrow lines illustrate the internal exhaust path of air exiting the liquid crystal display panel. The second sub-seal pattern 166 may be formed within the sub-seal pattern 172 and include at least two groups of at least two members provided outside a region found between the injection hole 162 and each of the at least two second exhaust holes 168b. Formed in such a manner, the second sub-seal pattern 166 may facilitate the transport between the injection hole 162 and the at least two second exhaust holes 168b out of the liquid crystal display panel. Accordingly, members of the at least two groups included within the second sub-seal pattern 166 that are closest to predetermined corresponding ones of the at least two second exhaust holes 168b may be formed so as to be shorter than members of the at least two groups included within the second sub-seal pattern 166 that are farthest away from the predetermined corresponding one of the at least two second exhaust holes 168b. Since no portions of the first or second sub-seal pattern 170 or 166, respectively, exists between the injection hole 162 and the exhaust hole 168, an unobstructed exhaust path may be provided to air being exhausted from within the liquid crystal display panel. Furthermore, generation of the deleterious alignment spots may be avoided using the seal pattern structure of the present invention.

According to the principles of the present invention, the aforementioned seal pattern need not necessarily be confined to the structure described herein but may be altered without departing from the scope of the present invention.

A material removal process for forming the liquid crystal display devices (e.g., ultra-thin liquid crystal display devices) using the aforementioned seal pattern structure will now be explained.

An ultra-thin substrate having a thickness of, for example, between about 0.3 mm and about 0.6 mm may be formed by dipping a liquid crystal display panel including the aforementioned seal pattern structure into an etchant containing, for example, hydrofluoric acid (HF). In one aspect of the present invention, a concentration of hydrofluoric acid (HF) within the etchant may be below about 50%, for example, between about 16% and about 17%. In another aspect of the present invention, an etching time may span a in range between about 30 seconds and about 120 seconds.

In accordance with the principles of the present invention, an etching process used in forming ultra-thin substrates may be executed between, for example, the attachment (ST4) and cell cutting (ST5) processes as outlined in FIG. 2. Use of the seal pattern structure illustrated in FIG. 7 allows air introduced during the attachment process to be efficiently exhausted from the liquid crystal display panel while preventing etchant from penetrating into the cell during the etching process. The sub-seal pattern may be cut away in a process similar to that as described with reference to step (ST5) shown in FIG. 2.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A material removal process for forming a liquid crystal display device, comprising:
    providing a substrate, the substrate including first and second regions;
    providing a main seal pattern in a boundary between the first and second regions, the main seal pattern having an injection hole;
    providing a V-shaped seal pattern in the second region and spaced apart from the injection hole, the V-shaped seal pattern having an open portion facing a direction opposite the injection hole;
    providing a sub-seal pattern in the second region, the sub-seal pattern including an exhaust hole through which air is exhausted, the location of the exhaust hole corresponding to a location of the injection hole;
    removing a portion of the substrate; and
    separating the first region from the second region.

2. The material removal process according to claim 1, wherein the removing comprises etching the substrate in an etchant.

3. The material removal process according to claim 2, wherein the etchant comprises hydrofluoric acid.

4. The material removal process according to claim 2, wherein the concentration of hydrofluoric acid is below about 50%.

5. The material removal process according to claim 2, wherein the concentration of hydrofluoric acid is between about 16% and about 17%.

6. The material removal process according to claim 2, wherein the etching is performed between about 30 seconds and about 120 seconds.

7. The material removal process according to claim 1, wherein, after the removing, the substrate has a thickness of about 0.3 mm to about 0.6 mm.

8. The material removal process according to claim 1, wherein the first region includes a display region and the second region includes a non-display region.

* * * * *